Oct. 20, 1936.  C. F. SMITH  2,057,927
OPTICAL INSPECTION OF SCREW THREADS
Filed Jan. 31, 1934   5 Sheets-Sheet 1

Oct. 20, 1936.   C. F. SMITH   2,057,927
OPTICAL INSPECTION OF SCREW THREADS
Filed Jan. 31, 1934   5 Sheets-Sheet 2

Oct. 20, 1936.                C. F. SMITH                2,057,927
                    OPTICAL INSPECTION OF SCREW THREADS
                    Filed Jan. 31, 1934         5 Sheets-Sheet 5

Patented Oct. 20, 1936

2,057,927

UNITED STATES PATENT OFFICE

2,057,927

OPTICAL INSPECTION OF SCREW THREADS

Charles Frederick Smith, London, England, assignor to Adam Hilger Limited, London, England Application January 31, 1934, Serial No. 709,227
In Great Britain February 7, 1933

13 Claims. (Cl. 88—24)

The invention relates to the inspection of screw threads by optical means. Such methods aim at a true representation of the axial thread section and this is usually believed to be obtained if the screw is illuminated by a beam of parallel light, a shadow image being thrown on a screen by a projection lens. The nearest approach to the true profile is obtained when the projection lens axis is normal to the axis of the screw, the thread being illuminated by a parallel beam co-directional with the average rake. Similar considerations apply when ocular examination is used.

In general screw threads of which the dimensions are small compared with the screw diameter, e. g. Whitworth or Sellers' threads, may be projected satisfactorily since the rake (or helix angle) of the thread varies very little from crest to root of the thread. An important condition, which is not easy to obtain in the case of small threads such as those of the B. A. type, is that the focal plane must be located accurately on the axial section.

The rake may be increased to a point where the optical performance of the projection lens becomes poor in respect of distortion, definition, or colour, and it is then preferable to orient the screw so that the axis of the lens is co-directional with the rake. The conditions are then at their best for the avoidance of the above aberrations, and a lens of smaller focal aperture may be used. Any profile drawing or master for comparison must then however be designed to represent the section of the thread in a direction normal to the average rake, but otherwise passing through the axis of the screw. The illumination, as before, is directed so as to coincide with the average rake.

It has been found however that it is not possible with an optical system such as referred to above to project satisfactorily threads which are of large dimensions compared with the screw diameters, and which in addition may have large rakes, such as would be the case in a three or four start thread. An example of such threads is a gramophone motor worm, which may vary from one to four starts; these threads are otherwise similar in that the thread sections are large compared with the worm diameters. Inspection of the problem shows that the rake at the crest of such screws differs materially from that at the root. The rake is calculated from the formula $$\text{Tan } \alpha = \frac{P}{\pi D}$$

where
P = pitch
D = diameter
α = rake or helix angle.

The following examples of gramophone worms indicate the variation of rake at the crest, and root respectively:—

| No. | No. of threads | Pitch | Crest dia. | Root dia. | Rake |  |  | Tan α equals $\frac{P}{\pi D}$ |
|---|---|---|---|---|---|---|---|---|
|  |  |  |  |  | Crest | Difference | Root |  |
| 1 | 2 | .25" | .25" | .12" | 17° 42' | 15° 51' | 33° 33' | .318 / .663 |
| 2 | 2 | .16" | .17" | .07" | 16° 42' | 19° 26' | 36° 8' | .3 / .73 |
| 3 | 3 | .23" | .19" | .10" | 21° 6' | 15° 8' | 36° 14' | .386 / .733 |

For comparison the following Whitworth and B. A. threads are given, these being of course all single start threads. The figures would be slightly modified by using particulars of screws standard in American practice instead of the British screws actually referred to, but the differences would not be such as to alter the general conclusions developed from the figures.

| No. | Pitch, in. | Crest dia., in. | Root dia., in. | Rake |  |  | Tan α equals $\frac{P}{\pi D}$ |
|---|---|---|---|---|---|---|---|
|  |  |  |  | Crest | Difference | Root |  |
| 1" Whit | .125 | 1.0 | .8399 | 2° 18' | 25' | 2° 43' | .04 / .0475 |
| ¼" " | .05 | .25 | .186 | 3° 39' | 1° 14' | 4° 53' | .0637 / .085 |
| 0. B. A. | .0394 | .2362 | .189 | 3° 3' | 45' | 3° 48' | .0531 / .066 |
| 10. B. A. | .0138 | .0669 | .0504 | 3° 46' | 1° 14' | 5° 0' | .0658 / .0873 |

Consideration of these figures shows that in order to obtain a true thread section the illumination required to be something more than a simple parallel beam, since if such a beam is directed along the rake at the crest the direction at the root should be quite different, and may differ by as much as 19° 26'. Even in the case of the 1" and ¼" Whitworth screw the directions differ by 25' and 1° 14' respectively. In screws of this kind these rake differences have been masked owing to the fact that a parallel beam proceeds from each point of the light source and the collimation is therefore only approximate; in fact if the collimator lens is 6" focal length, and the diameter of a pointolite ball is about 0.10" the maximum divergence of the various parallel beams is about 1°. Each point on the flank is subjected to illumination from various directions within the limits of 1° and there is therefore some illumination for every point on the flank. However, parts of the flank forward of, or behind, the axial section are also illuminated due to this light distribution, and the image of the flank is therefore likely to be fringed.

It is evident that when the proportions of the screw are such that the variation of rake from root to crest is more than about 1° the illumination must be better than the simple collimated beam, since if the light source is increased in size the illumination on either side of the axial section is increased and fringing or blurring of the projected image (whether received on a screen or in the field of an eyepiece) becomes worse.

According to the invention in the illumination of screw threads for inspection purposes by means of light travelling in a direction substantially tangent to the thread flank at an axial section the direction of the rays of light is varied along the flank to suit the varying rake of the thread at different distances from the axis of the screw.

For ideal illumination the light at the various points along the axial section of the flank should consist of collimated beams in planes parallel to each other and to the screw axis but differently directed in their planes so as to coincide at each point with the rake. If $\beta$ represents the difference in angle of rake between root and tip this must also be the range of angle covered by the collimated beams. In other words the illuminating beam must be skewed so as to consist of an infinite number of co-existing laminae varying steadily in direction, though a finite number of steps will usually provide an entirely satisfactory approximation. Where screws of different dimensions have to be inspected it is necessary to provide some controlling means to vary the angle $\beta$.

Various arrangements of apparatus may be used to put the invention into practice, some of which are illustrated in the accompanying drawings, in which

Figure 9 is a plan and Figure 10 an elevation to show the construction of modified means for directing the several laminae of light in the right direction by stepped lens refraction, Figure 11 is a plan and Figure 12 an elevation of the same ready for use, Figure 13 is a diagram showing the same in relation to the associated parts, Figure 14 is a plan and Figure 15 an elevation showing diagrammatically another modification of means for the same purpose using stepped prism refraction, Figures 16 and 17 correspond to the last-named and show an alternative arrangement using stepped prism refraction, Figures 18 and 19 are elevation and plan showing a stage in manufacture, Figures 20, 21, and 22 are elevation, plan and end elevation respectively showing further stages in manufacture, Figure 28 is a plan and Figure 29 a sectional elevation of an alternative form of adjustable stepped reflector, Figure 33 shows diagrammatically in plan an arrangement with stepped concave reflector, Figure 34 is an elevation and Figure 35 an end elevation showing the construction of a further form of non-stepped device for directing the laminae of light, Figure 36 is a diagrammatic plan showing the same applied as a reflector, and Figure 37 is a corresponding plan showing it applied by refraction.

Figure 1:
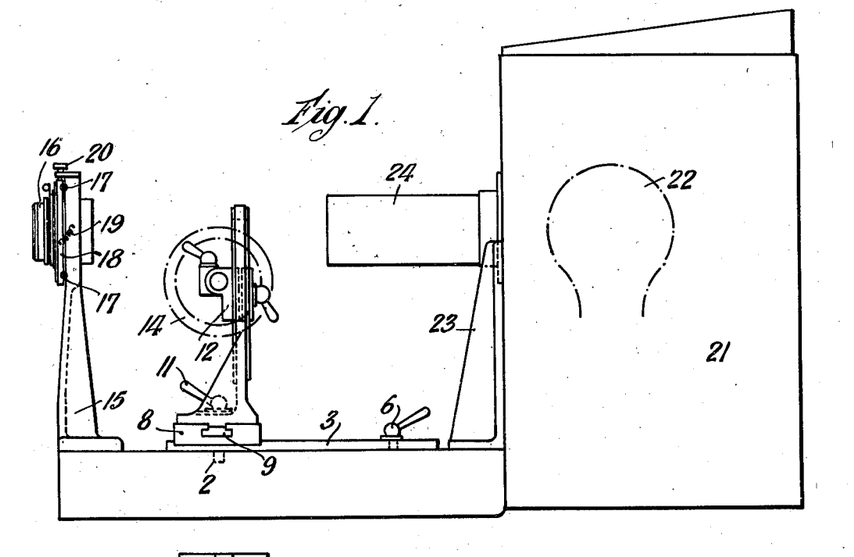
Figure 1 is an elevation and Figure 2 a plan of a projector for screen thread inspection.
Figure 2:
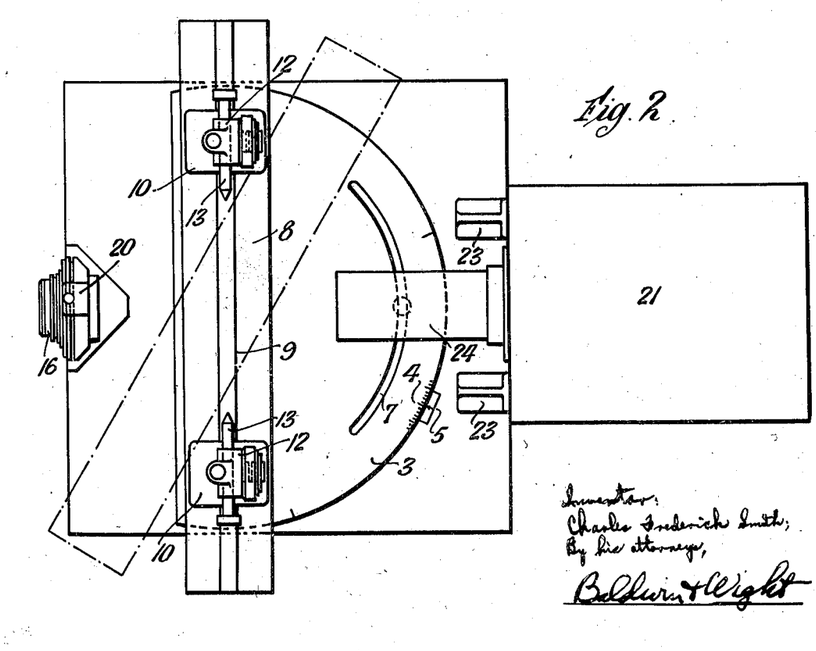

Referring to Figures 1 and 2 a large surface plate 1 serves as support for the apparatus. At 2 a semi-circular plate 3 is pivoted. Graduations 4 and an index 5 indicate the angular setting of the plate 3 and the setting is retained by a screw clamp 6 passing through a slot 7. A bar 8 is mounted on the plate 3 to be longitudinally slidable and has a T-groove 9 central with the pivot 2. Two uprights 10 are adjustably fixed by bolts 11 to the bar 8 and carry brackets 12 adjustable in height. The brackets 12 have centre points 13 for supporting the screw to be inspected. All the movements are such that the axis of the screw always passes through the vertical passing through the pivot 2. The screw is indicated by the two dotted concentric circles 14 in Figure 1. Figure 2 shows in chain-dotted lines how the bar 8 and with it the screw 14 can be swung about a vertical axis through the pivot 2 to bring the average rake of the thread parallel to the optical centre line.

A pedestal 15 serves as a support for the projection lens 16 from which it is separated by three balls 17 and a metal carriage 18 the whole being held together by inclined tension springs 19 arranged one on each side and impelling the carriage 18 against an adjusting screw 20. The adjusting screw 20 makes it possible to carry out small vertical adjustments in the lens position to bring the projection of the thread into coincidence with a master drawing which may have been pinned to the projection screen. This procedure is frequently more convenient than moving the screw being examined, particularly as the latter may in some cases be 2′ 6″ or more in length and weigh several hundredweight.

The projecting lens has to fulfill certain requirements. It should be capable of dealing with light pencils bearing an angle of as much as 20° to each other although not projecting an object larger than its own diameter. This is seldom the case with commercial projecting lenses but a compromise may be arrived at, for example, with a projecting lens having an aperture of F/2.9 and focal length of 7″. Using this lens, if the width of thread section in different cases is 1″, ¾″, ½″, and ¼″ the corresponding angular fields which can be used are 10°, 12°, 14°, and 17° respectively. These dimensions allow a large range of commercial work to be dealt with without incurring the expense and delay of computing and making a specially designed lens to fit the ideal conditions. It will also be observed from Figure 2 which is approximately to scale that in a somewhat similar way the maximum helix angle which can be dealt with depends on the diameter of the worm thread under examination since the projection lens may get in the way of the worm when it is swung round to suit the helix angle if the helix angle and worm diameter exceed certain figures dependent on the dimensions of the apparatus.

Figure 3:
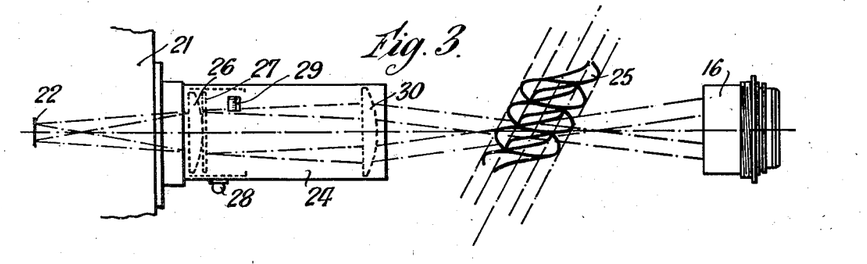
Figure 3 is a diagrammatic plan of parts of the same with a screw under inspection.

At the opposite end of the surface plate 1 to the projection lens a box 21 containing a source of light 22 is mounted on brackets 23. On the front of the box 21 there is a tube 24 containing the illuminating arrangement by means of which the direction of the rays of light is varied to suit the varying rake of the thread from root to tip. The details of this arrangement are shown in Figure 3.

The light source 22 is in this case a straight filament mounted in the same axial plane as the axis of the worm 25, in this case horizontal. A plano-convex lens 26 acts as a condenser and is located so that the filament 22 is at its principal focus. Thus the light after passing the condenser 26 is collimated as regards any one point of the filament but there is a range of direction as between one point and another of the filament.

To select the correct direction for each horizontal lamina of the beam thus collimated a disc 27 is located immediately in front of the condenser 26 having a slit cut in it. This disc is rotatable for a purpose which will be dealt with later, and rotation is effected by a handle 28, the setting being indicated by a scale and pointer 29.

A cylindrical lens 30 with vertical axis is located so that the disc 27 is at its principal focus. Thus a horizontal lamina of light passing through the cylindrical lens will remain a horizontal lamina and be in the same plane, but its distribution in the horizontal plane will be affected. After passing the cylindrical lens 30 the light will be collimated in the horizontal plane and the direction of collimation in relation to the optical axis of the system will depend on the horizontal position of the corresponding point of the slit in the disc to left or right of this axis. It will be seen that each horizontal lamina of light comes from a different point of the slit in the disc 27 and if the slit is oblique the light will be collimated in each lamina at a different angle.

The disc 27 is made rotatable to suit different variations of rake in relation to height of thread. If the angle of the disc slit with the vertical is $\theta$, the height of thread $h$, the difference of rake $\beta$ and the focal length of the cylindrical lens $f$, then $\theta$ may be obtained from the equation:

$$\tan \theta = \frac{2f}{h} \tan \frac{\beta}{2}$$

Where the helix angle or rake of a screw is comparatively small, although larger than in screws of the Whitworth or similar forms, it may be unnecessary to incline the axis of the screw relatively to the general optical axis of the lens system. In these circumstances it is possible to project more than one thread and the filament should preferably be long enough for the cylindrical lens 30 to be fully illuminated at every point.

If, however, the screw thread has a large rake it is necessary to tilt the screw 25 relative to the optical axis and then it is not desirable to project more than one thread section, since the adjacent sections will be respectively behind and in front of the focal plane of the lens 16. In these circumstances it is unnecessary for the cylindrical lens 30 to be fully illuminated at every point since the laminated pencil of light at any adjacent point of the thread section will need only to be a little wider than the thread section itself. This effectively reduces the length of filament 22 required.

The condenser 26 may also be made cylindrical with horizontal axis but this necessitates a longer filament than with a spherical faced condenser.

Figure 4:
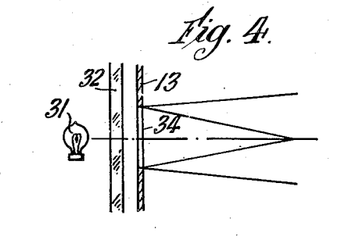
Figures 4 and 5 are diagrammatic representations of forms of illuminating device alternative to that of Figure 3.

Figure 4 shows an alternative method of illumination to replace the ribbon filament of Figure 3. A lamp 31 is mounted behind a diffusing screen 32 and on the other side of the screen a diaphragm 33 with horizontal slit 34 acts as the source of light. The slit 34 is mounted in the same location in Figure 3 as the filament 22.

Figure 5:
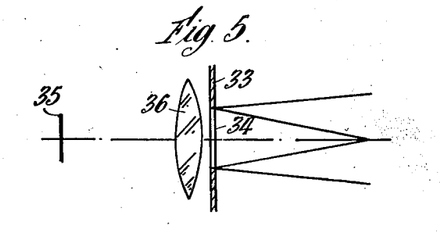
Figure 6:
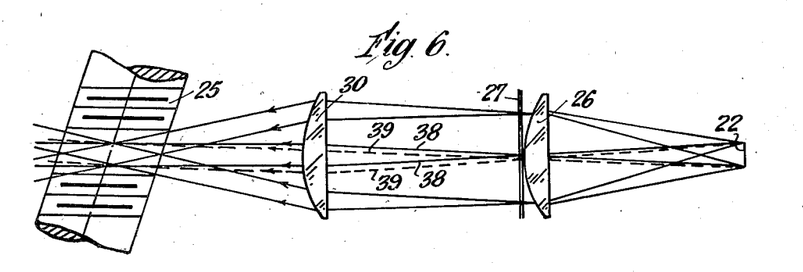
Figure 6 is a diagram to indicate a correction which may sometimes be required.
Figure 7:
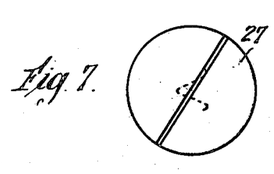
Figures 7 and 8 are alternative forms of slit relating thereto.
Figure 8:
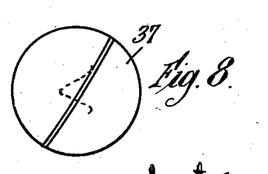

A further alternative is shown in Figure 5. A strip filament 35 is used with a supplementary condenser 36, and in front of the condenser 36 there is a diaphragm 33 with slit 34 as in the case of Figure 4. It is of advantage to mount the apparatus so that the filament 35 can be rotated with the disc 27.

It will be seen that with apparatus as described each part of the thread flank under inspection is illuminated by a lamina of light comprised within a narrow angle, the slit in the disc 27 being adjusted to the screw so that the direction of each lamina of light corresponds to the rake of the thread at the corresponding height where the flank is intersected by a vertical axial plane.

The use of a rotatable straight slit at the focus of the cylindrical lens 30 does not permit of a variation in the direction of the light rays which will correspond exactly with the varying rake of the thread, since the relationship between the angle of the helix at any point on the flank and its distance from the axis is not a linear one. The relationship is $$\tan \theta = \frac{p}{2\pi r}$$

where $\theta$ = the helix angle
$p$ = the pitch of the helix
$r$ = the distance of the point from the axis of the screw.

If a screw is taken having a rake difference $\beta$ between crest and root and the slit is set to accommodate such a screw, so that there is a difference $\beta$ in direction between the extreme beams, then that beam which is midway between the number of metal strips 52 whose edges are polished. They are mounted on a spindle 53 and may rotate freely on this. They are connected individually by means of fine metal threads 54 to a cone pulley 55 having a number of recesses corresponding to the number of strips. At the other end of the stepped mirrors 52 are a similar series of metal threads 56 which pass over a parallel pulley 57 their ends being connected to a flexible bar 58 which in turn is connected by two or more tension springs 59 to a fixed point 60. Thus if the cone pulley 55 is rotated by the handle 61 the stepped mirrors 52 will be rotated through angles which progressively increase, giving the desired conditions of illumination by reflection from the faces 62.

Figures 9, 10, 11, 12, 13, 14, 15, 16, 17, 18, 19, 20, 21, 22, 28, 29:
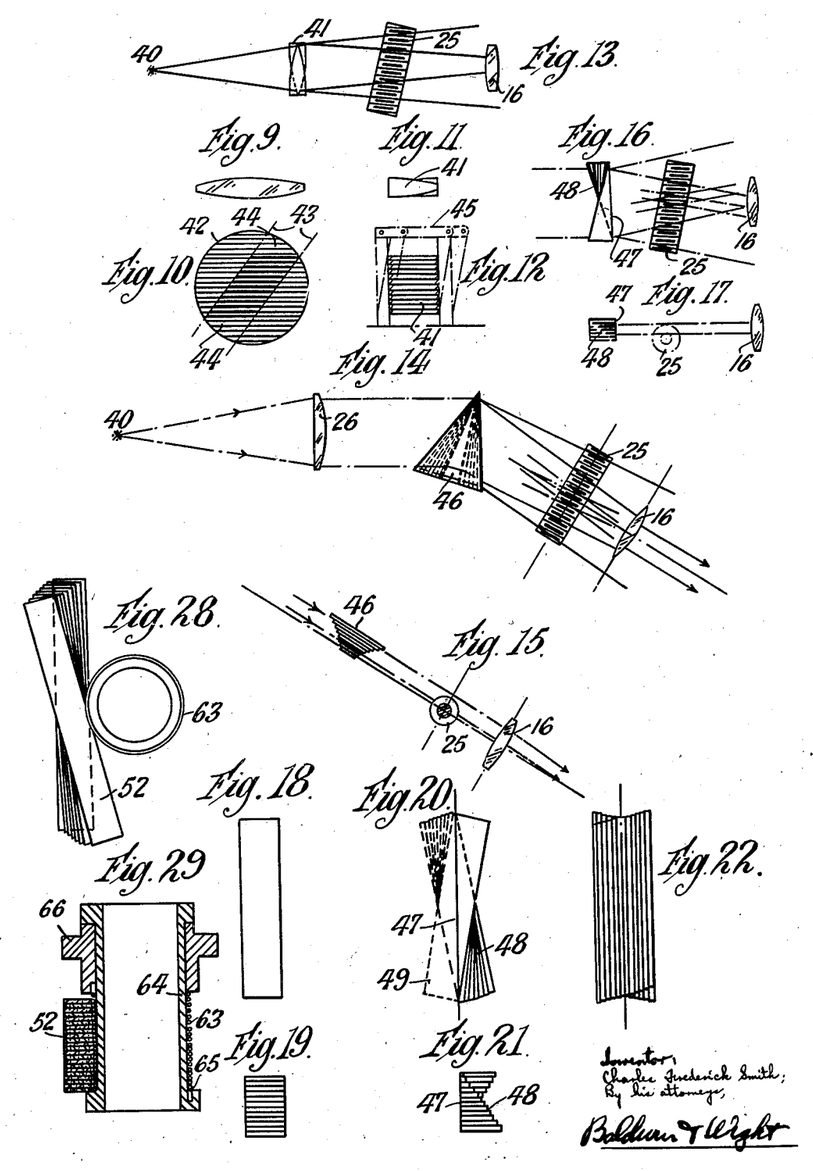
Figure 23:
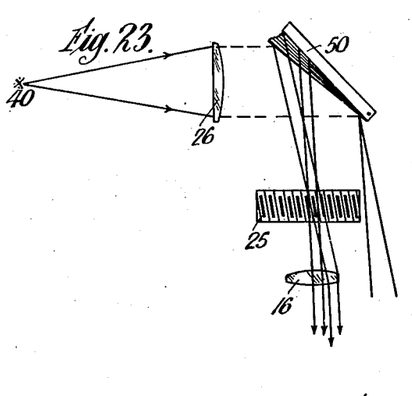
Figure 23 is a plan and Figure 24 an elevation showing diagrammatically a stepped reflector for the laminae of light.

Another method of obtaining the equi-angular spacing of the mirror strips 52 is shown in Figures 28 and 29. The strips are attached to successive turns of a coiled spring 63. One end of the spring is attached to a fixed support 64 at 65 and the other end is attached to a ring 66 rotatable on the support 64. Thus if the ring 66 is rotated the strip reflectors 52 which in the inert state of the spring 63 are parallel to each other, will assume equal angles to each other (reckoned one by one) owing to the twist of the spring being equally distributed amongst the coils.

Figure 30:
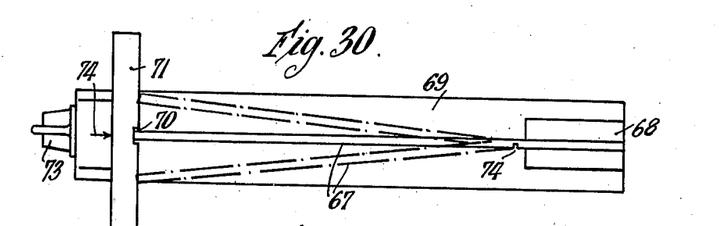
Figure 30 is a plan, Figure 31 an elevation and Figure 32 a diagrammatic end elevation showing a third form of adjustable stepped reflector.
Figure 31:
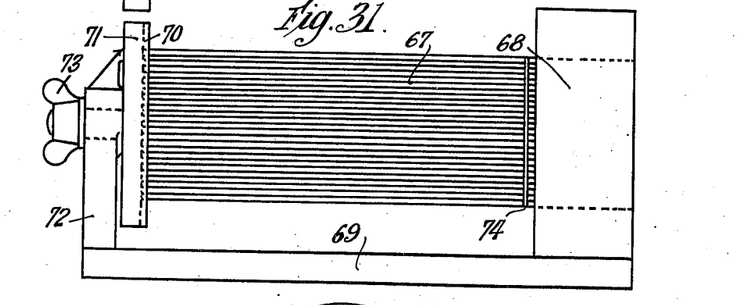
Figures 32, 34, 35, 36, 37:
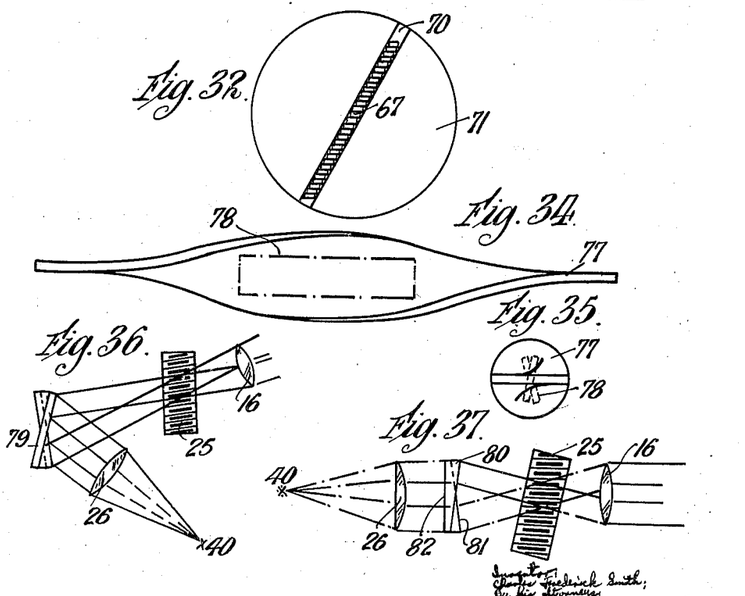

A further alternative construction of a stepped reflector is shown in Figures 30 to 32. In this arrangement an assemblage of polished metal strips 67 is made by making a series of fine sawcuts in a polished flat metal plate. One end of the plate is clamped at 68 to a fixed support 69 and the other end at which the saw-cuts commence is located in a groove 70 in a circular disc 71. The circular disc is mounted rotatably on a bracket 72 attached to the support 69 and when rotated and clamped by the nut 73 at some desired angle indicated by the arrow 74' the strips formed by the saw-cuts will be bent backwards and forwards as shown by the chain-dotted lines in Figure 30, each strip being advanced by a small angle in front of the next one. A cross saw-cut 74 near the fixed end facilitates the bending of the strips. Figure 32 is an end view of the strips as they would appear from the disc 71 when deflected.

Figures 24, 33:
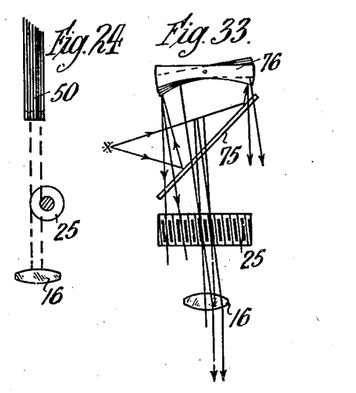
Figure 25:
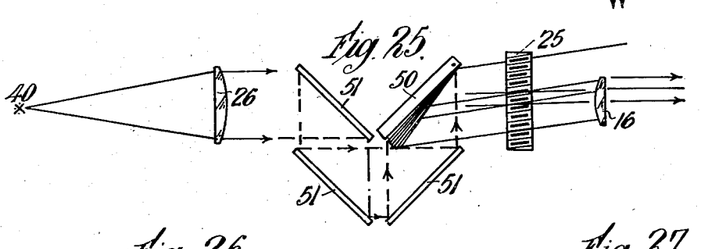
Figure 25 is a diagrammatic plan showing the adaptation of the last-named arrangement to existing apparatus.
Figure 26:
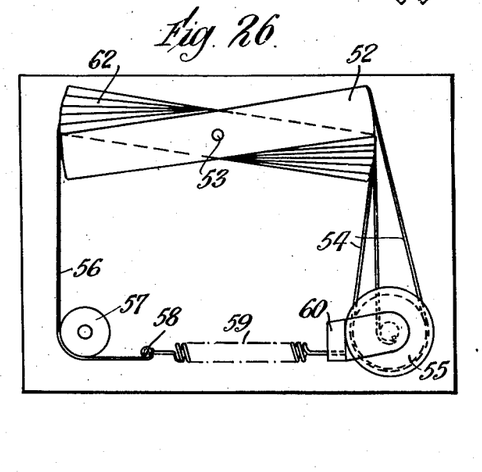
Figure 26 is a plan and Figure 27 an end elevation of an adjustable form of stepped reflector.
Figure 27:
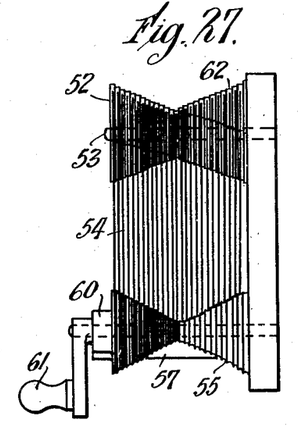

Figure 33 shows an alternative stepped mirror arrangement in which a separate condenser such as 26 is dispensed with. The light from a point source 40 is reflected by a pellicule or partially silvered mirror 75 to a stepped concave mirror 76 by which it is collimated and reflected on to the screw 25. The stepped mirror may be a fixed mirror made as described in connection with Figures 18 to 22, or more conveniently it is fitted with the adjusting arrangements of Figures 26 and 27 or that of Figures 28 and 29. In either case the concave face is ground and polished with the individual mirror strips unsplayed. This arrangement is usually more adapted for viewing the thread form by ocular observation than by projection, but in the latter case it may be possible to set up the arrangement so that the light reflected from the stepped mirror 76 does not need to pass through the mirror 75 and then the latter could be of the fully reflecting type.

An arrangement operating by reflection or refraction and having continuous gradation of angle in place of the stepped angles of the arrangements in Figures 9 to 33 may be constructed as shown in Figures 34 and 35. A rectangular polished strip 77 of glass is placed vertically in an electric furnace and heated to a temperature at which it will just twist when a torque is applied. If uniformly heated the application of a torque will then produce a twist of uniform pitch. The strip is twisted to the shape shown in Figures 34 and 35 and then allowed to cool. The part indicated by the line 78 may then be cut-out and used as a reflector in an arrangement as shown in Figure 36. Here a point source of light 40 is used as before with a condenser 26 and the skewed mirror 79 reflects the collimated light at the appropriate angles on to the thread flank of the screw 25, the image of which is formed by the projecting lens 16. Of course a metal strip could be treated in the same way as the glass strip 77 to constitute the mirror, or if it were sufficiently thin it could be twisted cold to a permanent form or be made for variable twist by an arrangement similar to that of Figures 30 and 31.

It is however also possible to use the part of the twisted glass plate bounded by the line 78 to give variable refraction. In this case the arrangement may be set up as shown in Figure 37. Here the point source 40, the condenser 26, the screw 25 to be inspected and the projection lens 16 are arranged in line and the skewed prism 80 is located between the condenser and the screw. The face 81 of this prism is made helical as described above, whereas the face 82 is made flat by grinding off the opposite helical face and polishing. It is not expected that the arrangement shown in Figures 34 to 37 will be very useful in the case of large divergencies of helix angle since the curvature of the surfaces across the section of the strip 77 would then become excessive and the light would no longer be collimated. For comparatively small differences of helix angle the arrangement will be useful since in the case of the screwed prism 80 in Figure 37 the process of manufacture is easy and in the case of the polished metal strip alternative of Figure 36 the twist may be altered if necessary by a simple mechanical device as already mentioned.

I claim:

1. Apparatus for illuminating screw threads for inspection purposes comprising a source of light, a collimator positioned to transmit light emanating at said source towards the screw thread, and collimation direction modifying means for effecting division of the collimated light into a plurality of coexisting laminae of light lying respectively in a succession of planes parallel to the general direction of the light and parallel to the screw axis, said laminae varying progressively in direction and each being substantially tangent to the screw thread at the appropriate section thereof whereby the direction of the laminae is varied along the thread flank to suit the varying rake of the thread at different distances from the axis of the screw.

2. Apparatus for illuminating screw threads for inspection purposes comprising a source of light, a collimator positioned to transmit light emanating at said source towards the screw thread, and collimation skewing means for effecting division of the collimated light into a plurality of coexisting laminae of light lying respectively in a succession of planes parallel to the general direction of the light and parallel to the screw axis, said laminae varying progressively in direction and each being substantially tangent to the screw thread at the appropriate section thereof whereby the direction of the laminae is varied along the thread flank to suit the varying rate of the thread at different distances from the axis of the screw.

3. Apparatus for illuminating screw threads for inspection purposes by means of light travelling in a direction substantially tangent to the thread flank at the appropriate section thereof, comprising in combination a substantially linear source of light, a collimating lens located so that the source of light is at its principal focus, a plate adjacent to the collimating lens and having a slit therein oblique to the source of light, and a cylindrical lens with its cylinder axis transverse to the source of light and located so that the slit plate is at its principal focus, the light source, slit plate and lenses being located along a common longitudinal axis.

4. Apparatus for illuminating screw threads for inspection purposes by means of light travelling in a direction substantially tangent to the thread flank at the appropriate section thereof, comprising in combination a substantially linear source of light, a collimating lens located so that the source of light is at its principal focus, a rotatable plate adjacent to the collimating lens and having a slit therein, a scale to show the rotational position of the plate, and a cylindrical lens with its cylinder axis transverse to the source of light and located so that the slit plate is at its principal focus, the light source, slit plate and lenses being located along a common longitudinal axis.

5. Apparatus for illuminating screw threads for inspection purposes by means of light travelling in a direction substantially tangent to the thread flank at the appropriate section thereof, comprising in combination a lamp with ribbon filament, a collimating lens located so that the filament is at its principal focus, a rotatable plate adjacent to the collimating lens and having a curved slit therein, a scale to show the rotational position of the plate, and a cylindrical lens with its cylinder axis transverse to the source of light and located so that the slit plate is at its principal focus, the light source, slit plate and lenses being located along a common longitudinal axis.

6. Apparatus for illuminating screw threads for inspection purposes by means of light travelling in a direction substantially tangent to the thread flank at the appropriate section thereof and for projecting an image of the thread so illuminated, comprising in combination a surface plate, a light box attached thereto and containing a lamp with ribbon filament, a collimating lens so located that the filament is at its principal focus, a rotatable plate adjacent to the collimating lens with a slit therein, a scale to indicate the rotational position of the slit plate, a cylindrical lens with its cylinder axis transverse to the direction of the filament and located so that the slit plate is at its principal focus, supporting means for the screw to be inspected so arranged that the screw is adjustable longitudinally, angularly and in height in relation to the surface plate, means for sliding the screw support in the axial direction of the screw, a pedestal on the surface plate, a carriage urged by springs against the pedestal and an adjusting screw therein, balls interposed between the carriage and the pedestal, and a projection lens mounted on the carriage, the filament, lenses and slit plate being located along a common longitudinal axis passing through the axis of angular adjustment of the screw support.

7. Apparatus for illuminating screw threads for inspection purposes by means of light travelling in a direction substantially tangent to the thread flank at the appropriate section thereof, comprising in combination a substantially point source of light, collimating means for the light, and stepped directing means for the light so collimated located to grade the direction of collimation along the said section of the thread flank in successive small steps to suit the varying rake of the thread between root and crest.

8. Apparatus for illuminating screw threads for inspection purposes by means of light travelling in a direction substantially tangent to the thread flank at the appropriate section thereof, comprising in combination a substantially point source of light, collimating means for the light, and stepped reflecting means for the light so collimated located to grade the direction of collimation along the said section of the thread flank in successive small steps to suit the varying rake of the thread between root and crest.

9. Apparatus for illuminating screw threads for inspection purposes by means of light travelling in a direction substantially tangent to the thread flank at the appropriate section thereof, comprising in combination a substantially point source of light, collimating means for the light, a set of laminae mounted on a common pivot and having reflecting edges located to reflect the collimated light on to the screw thread, and adjusting means to set the laminae at varying small successive angles to suit the varying rake of different threads between root and crest.

10. Apparatus for illuminating screw threads for inspection purposes by means of light travelling in a direction substantially tangent to the thread flank at the appropriate section thereof, comprising in combination a substantially point source of light, collimating means for the light, a set of laminae mounted on a common pivot and having reflecting edges located to reflect the collimated light on to the screw thread, a coned pulley, wires attached to the several laminae and to the coned pulley at various diameters thereof, a spring urged flexible bar, and wires attached to the other ends of the laminae and to the flexible bar, said pulley, bar and wires serving to set the laminae at varying small successive angles to suit the varying rake of different threads between root and crest.

11. Apparatus for illuminating screw threads for inspection purposes by means of light travelling in a direction substantially tangent to the thread flank at the appropriate section thereof, comprising in combination a substantially point source of light, collimating means for the light, and refracting means for the light so collimated located to grade the direction of collimation along the said section of the thread flank to suit the varying rake of the thread between root and crest.

12. Apparatus for illuminating screw threads for inspection purposes by means of light travelling in a direction substantially tangent to the thread flank at the appropriate section thereof, comprising in combination a substantially point source of light, collimating means for the light, and a refracting element with one face flat and the opposite face helically twisted, the said refracting element being located to grade the direction of collimation of the light passing through it to different points along the said section of the thread flank to suit the varying rake of the thread between root and crest.

13. Apparatus for illuminating screw threads for inspection purposes by means of light travelling in a direction substantially tangent to the thread flank at the appropriate section thereof, comprising in combination a point source of light, collimating means for the light and directing means for the light so collimated having a continuously curved surface and located to grade the direction of collimation along the said section of the thread flank to suit the varying rake of the thread between root and crest.

CHARLES FREDERICK SMITH.